United States Patent
Dain et al.

(10) Patent No.: US 11,693,878 B2
(45) Date of Patent: Jul. 4, 2023

(54) GENERATION OF A DATASET IN THE FORMAT OF A MACHINE LEARNING FRAMEWORK

(71) Applicant: INTERNATIONAL BUSINESS MACHINES CORPORATION, Armonk, NY (US)

(72) Inventors: Joseph W. Dain, Vail, AZ (US); Gregory T. Kishi, Oro Valley, AZ (US); Deepavali M. Bhagwat, Curpertino, CA (US); Lukas Rupprecht, San Jose, CA (US); Constantine Arnold, Morgan Hill, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 138 days.

(21) Appl. No.: 16/953,157

(22) Filed: Nov. 19, 2020

(65) Prior Publication Data
US 2022/0156276 A1 May 19, 2022

(51) Int. Cl.
*G06F 17/00* (2019.01)
*G06F 16/25* (2019.01)
(Continued)

(52) U.S. Cl.
CPC ............. *G06F 16/258* (2019.01); *G06N 5/04* (2013.01); *G06N 20/00* (2019.01)

(58) Field of Classification Search
CPC ......... G06F 16/258; G06N 5/04; G06N 20/00
See application file for complete search history.

(56) References Cited

U.S. PATENT DOCUMENTS

| 7,480,640 B1 | 1/2009 | Elad et al. |
| 10,489,683 B1 | 11/2019 | Koh et al. |

(Continued)

FOREIGN PATENT DOCUMENTS

| CN | 109816014 | 5/2019 |
| CN | 111092935 | 5/2020 |
| KR | 20190044814 | 5/2019 |

OTHER PUBLICATIONS

Herodotos Herodotou and Elena Kakoulli. Automating distributed tiered storage management in cluster computing. Proc. VLDB Endow, vol. 13, Issue 1, 43-56. <https://doi.org/10.14778/3357377.3357381>, Sep. 2019.*

(Continued)

*Primary Examiner* — Greta L Robinson
(74) *Attorney, Agent, or Firm* — Konrad Raynes Davda & Victor LLP; Rabindranath Dutta (57) ABSTRACT

A dataset formatted in a first format is generated, wherein the dataset formatted in the first format includes at least a plurality of data elements that comprise data. A selection is made of machine learning framework, wherein the machine learning framework operates on datasets formatted in a second format that is different from the first format. The dataset is converted from the first format to the second format and links are generated from the converted dataset formatted in the second format to the plurality of data elements of the dataset formatted in the first format to avoid creating additional copies of the plurality of data elements.

20 Claims, 7 Drawing Sheets

(51) Int. Cl.
  *G06N 5/04* (2023.01)
  *G06N 20/00* (2019.01)

(56) References Cited

U.S. PATENT DOCUMENTS

| | | |
|---|---|---|
| 10,789,509 B2 * | 9/2020 | Chan .................... G06K 9/6253 |
| 10,970,395 B1 * | 4/2021 | Bansal ................... G06F 21/566 |
| 2006/0277153 A1 * | 12/2006 | Mason ................... G06F 16/258 |
| 2011/0145296 A1 * | 6/2011 | Ellison ................... G06F 16/168 |
| | | 707/800 |
| 2019/0102675 A1 | 4/2019 | Biswas et al. |
| 2019/0156244 A1 | 5/2019 | Faulhaber, Jr. et al. |
| 2019/0318243 A1 * | 10/2019 | Margaglia ................ G06N 5/04 |
| 2020/0142625 A1 * | 5/2020 | O'Reilly ............... G06F 3/0685 |
| 2020/0258007 A1 | 8/2020 | Larson et al. |
| 2020/0272855 A1 | 8/2020 | Kang et al. |
| 2022/0021992 A1 * | 1/2022 | Popovac ............ A61N 1/36025 |

OTHER PUBLICATIONS

IBM Corp., "Create a Dataset", [online], [retrieved on Nov. 13, 2020], Retrieved from the Internet at <URL: https://www.ibm.com/support/knowledgecenter/SSWQ2D_1.1.0/us/deep-learning-dataset.html>, 4 pp.

Abstract and Machine Translation for CN Publication No. 109816014, published May 28, 2019, 12 pp.

Abstract and Machine Translation for CN Publication No. 111092935, published May 1, 2020, 8 pp.

Abstract and Machine Translation for KR Publication No. 20190044814, published May 2, 2019, 8 pp.

\* cited by examiner

GENERATION OF A DATASET IN THE FORMAT OF A MACHINE LEARNING FRAMEWORK

BACKGROUND

The disclosure relates to the generation of a dataset in the format of a machine learning framework.

Machine learning is the study of computer algorithms that improve automatically through experience. Machine learning may be regarded as a subset of artificial intelligence. Machine learning algorithms build a model based on sample data, known as "training data", in order to make predictions or decisions without being explicitly programmed to do so. After training, when the model is provided with an input, an output is generated to make predictions or decisions.

Artificial neural networks (also referred to as neural networks) are computing systems that may have been inspired by the biological neural networks that constitute animal brains. Neural networks may be configured to use a feedback mechanism to learn to perform certain computational tasks. Neural networks are a type of machine learning mechanism. Deep learning is part of a broader family of machine learning methods based on artificial neural networks with representation learning. Various frameworks (e.g. PyTorch*, TensorFlow*, etc.) are available for deep learning environments, making it easier to learn, build and train diversified neural networks.

Datasets are an integral part of the field of machine learning. Major advances in in the machine learning field have resulted from advances in learning algorithms (such as deep learning), computer hardware, and the availability of high-quality training datasets.

SUMMARY OF THE PREFERRED EMBODIMENTS

Provided are a method, system, and computer program product in which a dataset formatted in a first format is generated, wherein the dataset formatted in the first format includes at least a plurality of data elements that comprise data. A selection is made of a machine learning framework, wherein the machine learning framework operates on datasets formatted in a second format that is different from the first format. The dataset is converted from the first format to the second format and links are generated from the converted dataset formatted in the second format to the plurality of data elements of the dataset formatted in the first format to avoid creating additional copies of the plurality of data elements.

In additional embodiments, in response to identifying files or objects associated with a selected dataset based on system or custom metadata, the selected dataset is copied from a capacity storage tier to a performance storage tier and while performing the copying to the performance storage tier it is ensured that the files or the objects are copies in the second format required for the machine learning framework.

In further embodiments, the capacity storage tier has a greater storage capacity but a lower speed of performance for input/output (I/O) operations in comparison to the performance storage tier.

In yet further embodiments, on completion of a workflow in the machine learning framework, new results are written to the capacity storage tier.

In certain embodiments, the converting is performed in response to receiving a notification from a storage device that new data exists.

In further embodiments, the copying of the selected dataset from the capacity storage tier to the performance storage tier is performed, in response to receiving a notification from a storage device that new data exists.

In additional embodiments, workflow for training in the machine learning framework is invoked while pre-fetching the selected dataset from the capacity storage tier to the performance storage tier.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

Running machine learning and deep learning workloads presents a significant challenge for data scientists as the amount of data may be voluminous. Data scientists may spend a significant portion their time trying to find the right data for their model, where the data a particular model associated with other elements may be referred to as a "dataset."

For example, in contemporary artificial intelligence applications, a significant volume of internet of things (IoT) data may be continually ingested into a large storage space spanning tens to hundreds of petabytes that may store hundreds of billions of files, objects, database tables, etc. In some situations, the IoT data may arrive "pre-labeled", which means that some basic form of machine learning may have been applied at the edge in order to provide the raw data along with some labeling. For example, if the IoT data comprises images, which can either be standalone images or individual frames from a video, a set of labels may be correlated with those images that comprise some form of image classification taxonomy and labeling or some form of bounding box labeling. Semantic segmentation is another example of labels (sometimes denoted as enrichments) to the raw data. Typically label file may be included in with the raw images or data. In certain mechanisms, the label file is in some semi-structured format such as comma separated value (CSV), Javascript object notation (JSON), Extensible Markup Language (XML), etc. In other environments a new IoT object may be created that combines the labeling or enrichment information into a new data structure.

Currently there is no standard mechanism to organize and catalog this data. To find the relevant data for a particular mode, a data scientist may have to come up with a method for reducing the vast amount of data by looking at the system metadata (e.g. file name, object name, creation time of files or objects, etc.). Once some data is identified, the data scientist may have to determine what labels or enrichments are associated with the raw data. This process may take a significant amount of time and is referred to as the data preparation phase.

Once the dataset of interest is identified, the files associated with the dataset needs to be prepared in a manner specific to deep learning or machine learning model that the dataset will be used for. For example, when creating a TensorFlow* dataset, a training folder, a validation folder, and a testir folder may be provided and each folder contains a TFRecord file. A label file also needs be provided and a spark instance group may have to be indicated. Different model training stacks like Caffe or PyTorch* or IBM Watson* Application Programming Interfaces (API) may require different data formats. Currently this procedure is manually performed by the end user (e.g. a data scientist) and multiple copies of the same data are created during this process. In certain embodiments, the IoT data may come without any labels and in such embodiments the IoT data is analyzed via an inference model to perform the proper labeling.

Certain embodiments create a dataset in the required format of the machine learning or deep learning tools automatically and transparently based on search results of the system and custom metadata of the datasets without moving the original data in the dataset and without creating additional copies of the data.

In additional embodiments, in response to identifying files or objects associated with a dataset based on the system or custom metadata, the datasets are copied from a capacity storage tier to a performance storage tier and when performing the copy to the performance storage tier, it is ensured that the files or objects are copies in the directory format required for the machine learning or deep learning algorithm.

In further embodiments, the creation of the dataset in the required format of the machine learning or deep learning tools may be performed in response in response to receiving a notification from a storage device that new data exists.

Such embodiments improve the functionality of a computational device that perform machine learning.

Figure 1:
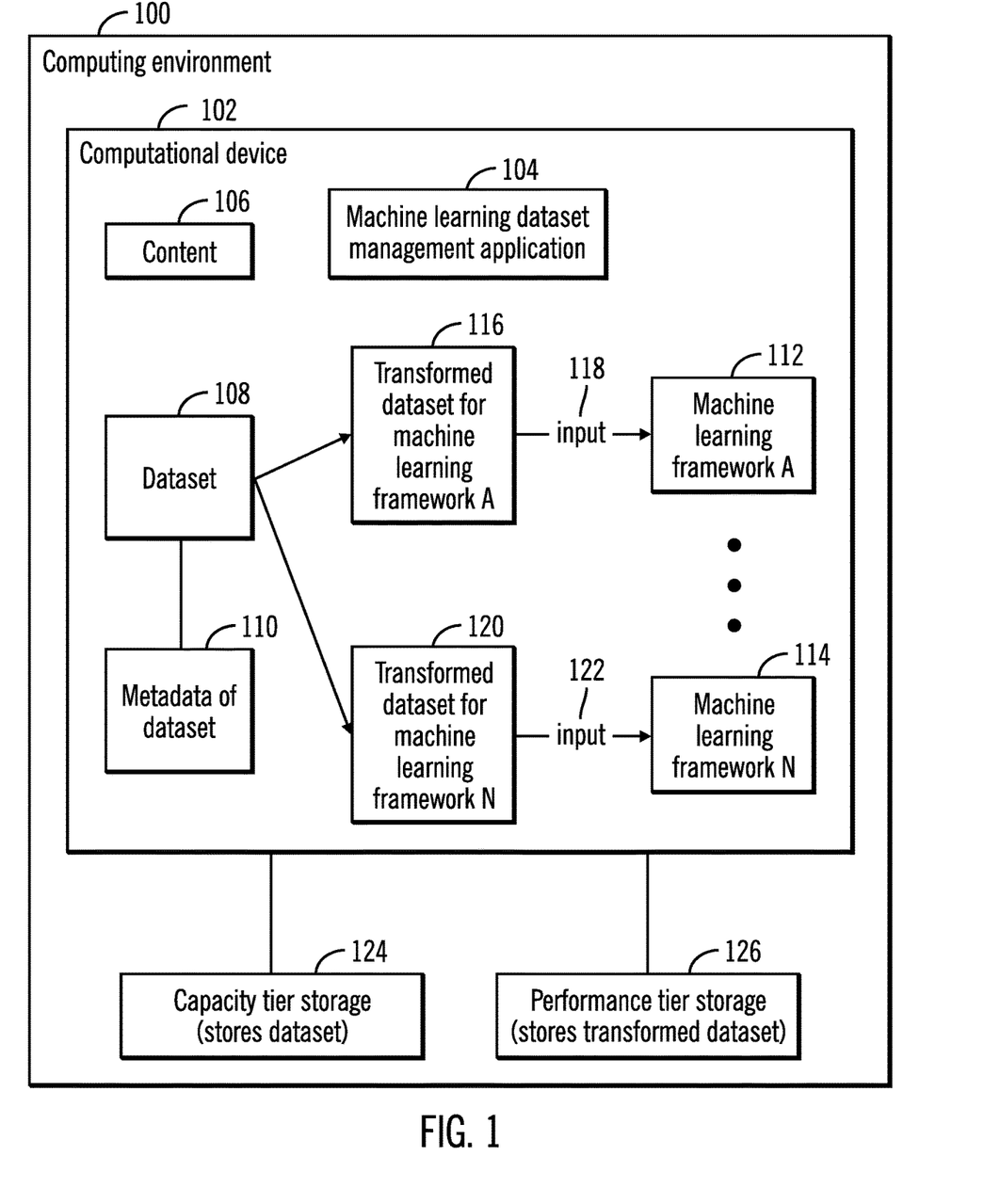
FIG. 1 illustrates a block diagram of a computing environment comprising a computational device that executes a machine learning dataset management application, in accordance with certain embodiments.

FIG. 1 illustrates a block diagram of a computing environment 100 comprising a computational device 102 that executes a machine learning dataset management application 104, in accordance with certain embodiments.

The computational device 102 may comprise any suitable computational device including those presently known in the art, such as, a personal computer, a workstation, a server, a mainframe, a hand held computer, a palm top computer, a telephony device, a network appliance, a blade computer, a processing device, a controller such as a storage controller, etc. The computational device 102 may be coupled to any suitable network, such as, a local area network, a wide area network, the Internet, an intranet. In certain embodiments, the computational device 102 may be an element in a cloud computing environment. In alternative embodiments, the components, applications, data, and data structures shown in the computational device 102 may be distributed among a plurality of computational devices coupled by a network.

In certain embodiments, the machine learning dataset management application 104 that executes in the computational device 102 may be implemented in software, firmware, hardware, or any combination thereof. A user may search on content 106 accessed via the computational device 102 to identify datasets 108 of interest, where metadata 110 may be associated with the datasets.

A plurality of machine learning frameworks 112, 114 may execute in the computational device 102. In alterative embodiments, the machine learning frameworks 112, 114 may execute in a one or more computational devices that are different from the computational device 102. Some examples of such machine learning frameworks 112, 114 include PyTorch*, TensorFlow*, Caffe, etc. The machine learning frameworks 112, 114 may not be able to take the dataset 108 as an input as each machine learning framework may need datasets and other files in a different format.

The machine learning dataset management application transforms the dataset 108 into a format that is understandable to the machine learning frameworks 112, 114. For example, the machine learning dataset management application 104 transforms the dataset 108 into a format (referred to as transformed dataset 116) that is understandable to the machine learning framework 112 and is provided as an input 118 to the machine learning framework 112, and the machine learning dataset management application 104 transforms the dataset 108 into a format (referred to as transformed dataset 120) that is understandable to the machine learning framework 114 and is provided as an input 122 to the machine learning framework 112.

In certain embodiments, storage coupled either directly or via a network to the computational device 102 may be a tiered storage comprising a capacity tier of storage 124 and a performance tier of storage 126. The capacity tier of stage 124 has a larger storage capacity than the performance tier of storage 126, whereas the performance tier of storage 126 can perform input/output (I/O) operations faster than the capacity tier of storage 124. For example, the performance tier of storage 126 may comprise storage disks accessible via the Non-Volatile Memory Express (NVME*) protocol, and the capacity storage may comprise storage disks accessible via the Serial Advanced Technology Attachment (SATA) protocol. In certain embodiments, the dataset 108 may be stored on the capacity tier storage 124 and the transformed datasets 116, 120 may be stored in the performance tier of storage 126. In certain embodiments, links (i.e., pointers) may be maintained from the transformed datasets 116, 120 to the dataset 108 to avoid creating additional copies of the original data in the dataset 108. As a result, the machine learning frameworks 112, 114 are able to perform I/O with the transformed dataset 116, 120 with a higher speed than mechanisms in which the transformed datasets 116, 120 are also stored in the capacity tier storage 124. Since the storage capacity of the performance tier storage 126 is relatively low in comparison the storage capacity of the capacity tier storage 124, a balance of performance and storage capacity is maintained for applications and frameworks that execute in the computational device 102.

Figure 2:
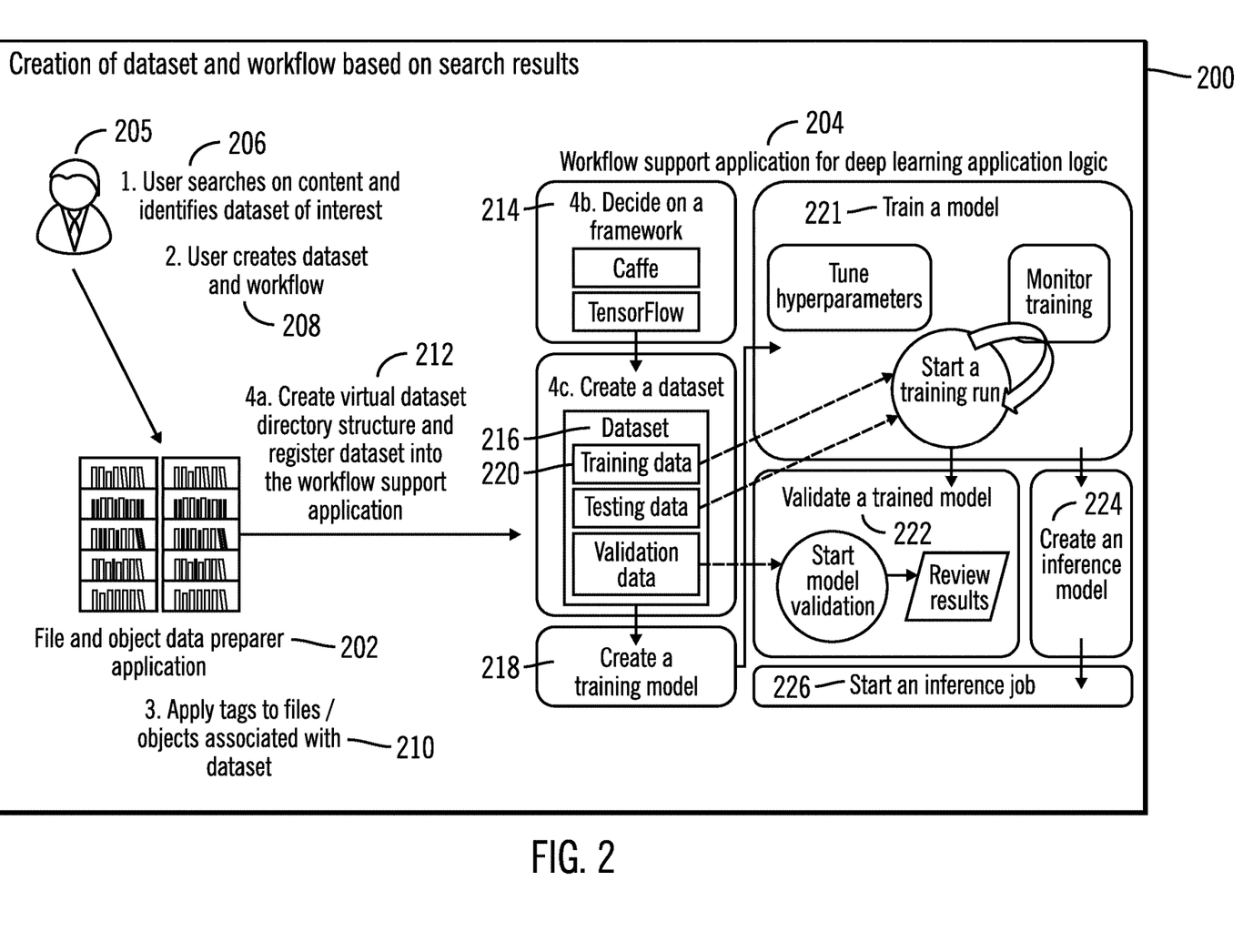
FIG. 2 illustrates a block diagram that shows the creation of dataset and workflow based on search results, in accordance with certain embodiments.

FIG. 2 illustrates a block diagram 200 that shows the creation of dataset and workflow based on search results, in accordance with certain embodiments. While different applications, elements, and operations have been shown in FIG. 2 in comparison to FIG. 1, the applications, elements, and operations shown in FIG. 2 may be included in the computational device 102 of the computing environment 100 shown in FIG. 1.

FIG. 2 shows a file and object data preparer application 202 and a workflow support application for deep learning application logic 204. A user 205 interacts with at least the file and object data preparer application 202.

In certain embodiments, the user 205 searches on content and identifies a dataset of interest to the user 205 (as shown by reference numeral 206). This may be performed by searching a catalog based on system metadata (e.g., name or object name), custom metadata tags (e.g. project name), and/or labeling metadata. For example, images of wafers from a manufacturing line may contain labeling data such as "contains cracks," "warped," etc., indicating the quality of the yield that may be determined by some type of image classification or object detection method.

Once the user 205 is satisfied with the search results, the user 205 creates a dataset and initiates a workflow (as shown via reference numeral 208) and tags are applied to files and objects associated with the dataset (as shown via reference numeral 210).

The user 205 is prompted to provide the framework (e.g., choices are Caffe* and Tensorflow* 214) to which the dataset should be registered and to optionally automatically invoke a workflow to initiate a training of a model in the framework with the dataset. The user 205 may be prompted to enter a name for the dataset which results in updating of the catalog with the dataset name for the associated files and objects. The directory structures that are required for the framework are automatically created and symbolic links or hard links to the source data from the search results are created in the directories. The dataset that is created with the training data, the testing data, and the validation data is shown via reference numeral 216. The dataset 216 is created in the format for the framework selected by the user 205.

Once the directory structure and links are created, the dataset is registered with the framework based on the framework selected by the user, the workflow to train the model is invoked via the workflow support application for deep learning application logic 204. Generation of the training model 218 and training of the model 221 with training data 220, validation of the trained model 222, creation of an inference model 224, and the starting of an inference job 226 are also shown in FIG. 2.

Figure 3:
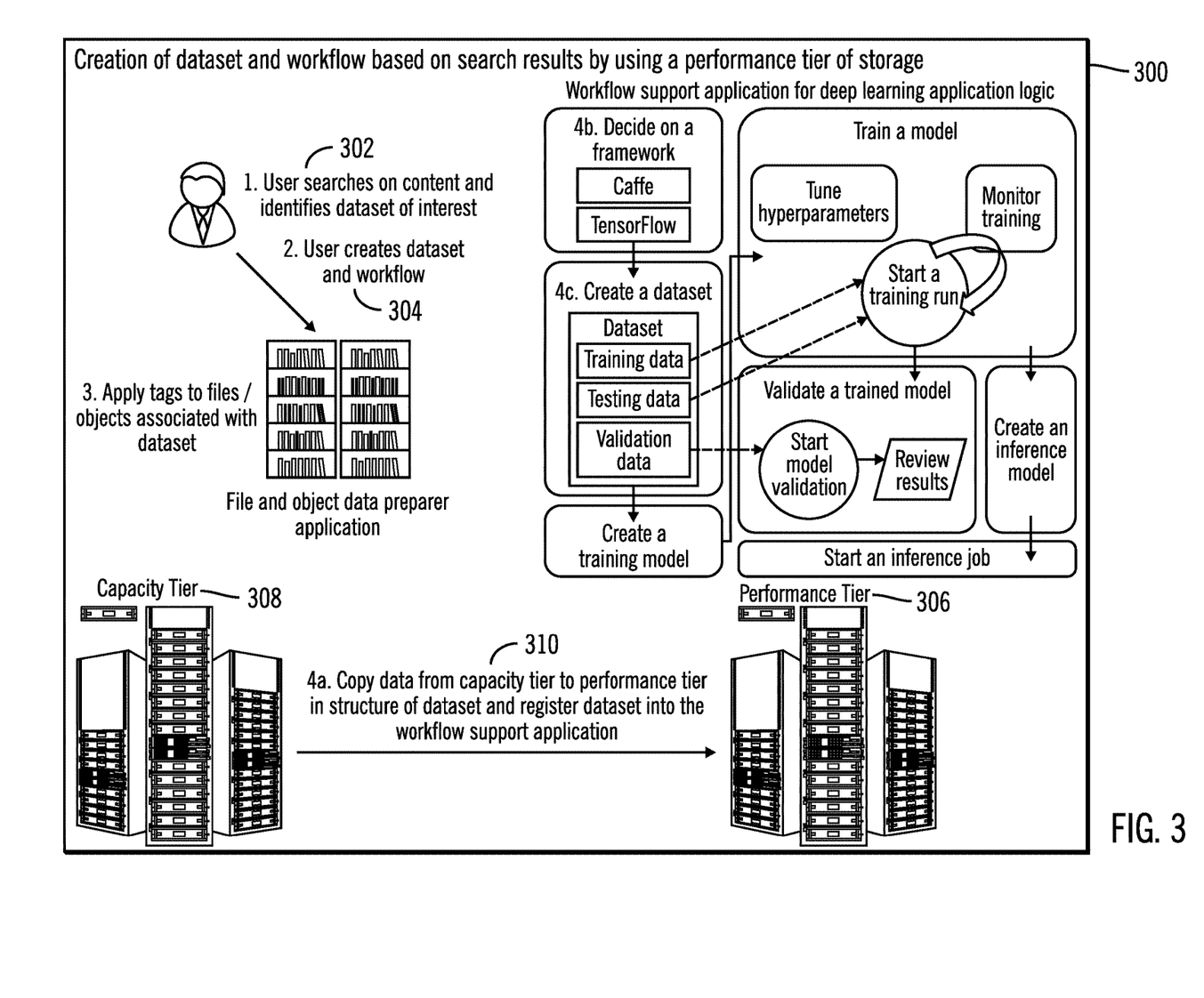
FIG. 3 illustrates a block diagram that shows the creation of dataset and workflow based on search results by using a performance tier of storage, in accordance with certain embodiments.

FIG. 3 illustrates a block diagram 300 that shows the creation of dataset and workflow based on search results by using a performance tier of storage, in accordance with certain embodiments. While different applications, elements, and operations have been shown in FIG. 3 in comparison to FIG. 1, the applications, elements, and operations shown in FIG. 3 may be included in the computational device 102 of the computing environment 100 shown in FIG. 1.

A user searches the catalog based on system metadata (reference numeral 302). Once the user is satisfied with the search results, the user creates a dataset and initiates a workflow (reference numeral 304). The user is prompted to provide the framework to which the dataset should be registered and to optionally invoke a workflow to initiate the training of a model in the framework with the dataset. The user may be prompted to enter a name for the dataset which results in updating of the catalog with the dataset name for the associated files and objects.

In response to operations shown via reference numeral 304, the directory structures that are required for the framework are automatically created in the performance storage tier (e.g. a tier with NVMe drives) 306 and files/objects from the capacity tier 308 are copied into the performance tier 306 (as shown via reference numeral 310). As the files are copied the dataset is registered with the framework based on the framework selected by the user and the workflow to train the model is optionally automatically invoked while the data is being prefetched from the capacity storage tier 308.

After the workflow is complete, the label data may be added to the catalog and the data associated with the dataset may be expired and any new results written back to the capacity tier 308.

Figure 4:
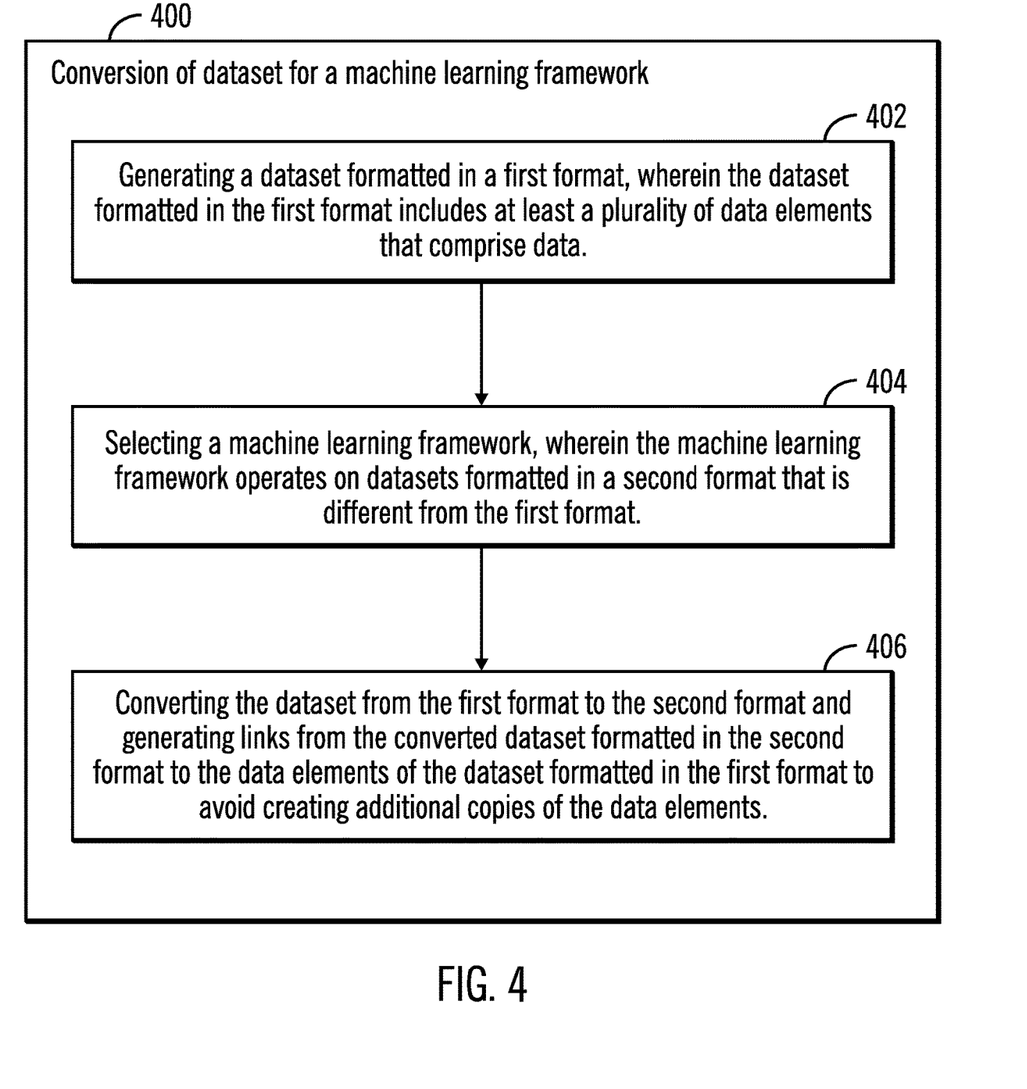
FIG. 4 illustrates a flowchart that shows operations for the conversion of a dataset for a machine learning framework, in accordance with certain embodiments.

FIG. 4 illustrates a flowchart 400 that shows operations for conversion of a dataset for a machine learning framework, in accordance with certain embodiments. The operations shown in FIG. 4 may be performed by the machine learning dataset management application 104 that executes in the computational device 102 of the computing environment 100, in accordance with certain embodiments.

Control starts at block 402 in which a dataset formatted in a first format is generated, wherein the dataset formatted in the first format includes at least a plurality of data elements that comprise data. A selection is made (at block 404) of machine learning framework, wherein the machine learning framework operates on datasets formatted in a second format that is different from the first format.

From block 404 control proceeds to block 406 in which the dataset is converted from the first format to the second format and links are generated from the converted dataset formatted in the second format to the data elements of the dataset formatted in the first format to avoid creating additional copies of the data elements.

In certain embodiments, in response to identifying files or objects associated with a selected dataset (e.g., the dataset formatted in the first format) based on system or custom metadata, the selected dataset is copied from a capacity storage tier to a performance storage tier and while performing the copying to the performance storage tier ensuring that the files or the objects are copies in the second format required for the machine learning framework, where the capacity storage tier has a greater storage capacity but a lower speed of performance for input/output (I/O) operations in comparison to the performance storage tier.

Therefore, FIGS. 1-4 illustrate embodiments for converting a dataset to be compatible with a machine learning framework, without copying the data associated with the dataset by maintaining links from the converted dataset to the original dataset. The converted dataset for the machine learning framework is stored in a performance storage tier, while the original dataset is stored in a capacity storage tier.

Cloud Computing Environment

Cloud computing is a model for enabling convenient, on-demand network access to a shared pool of configurable computing resources (e.g., networks, servers, storage, applications, and services) that can be rapidly provisioned and released with minimal management effort or service provider interaction.

Figure 5:
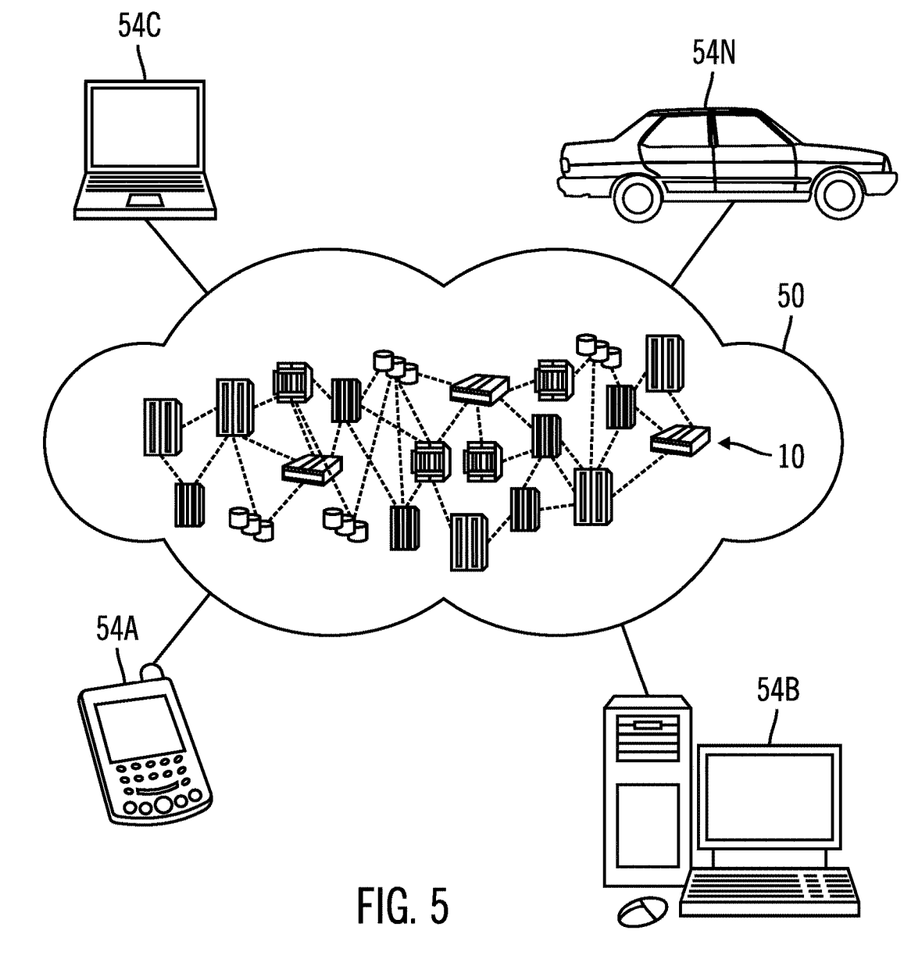
FIG. 5 illustrates a block diagram of a cloud computing environment, in accordance with certain embodiments.

Referring now to FIG. 5 an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
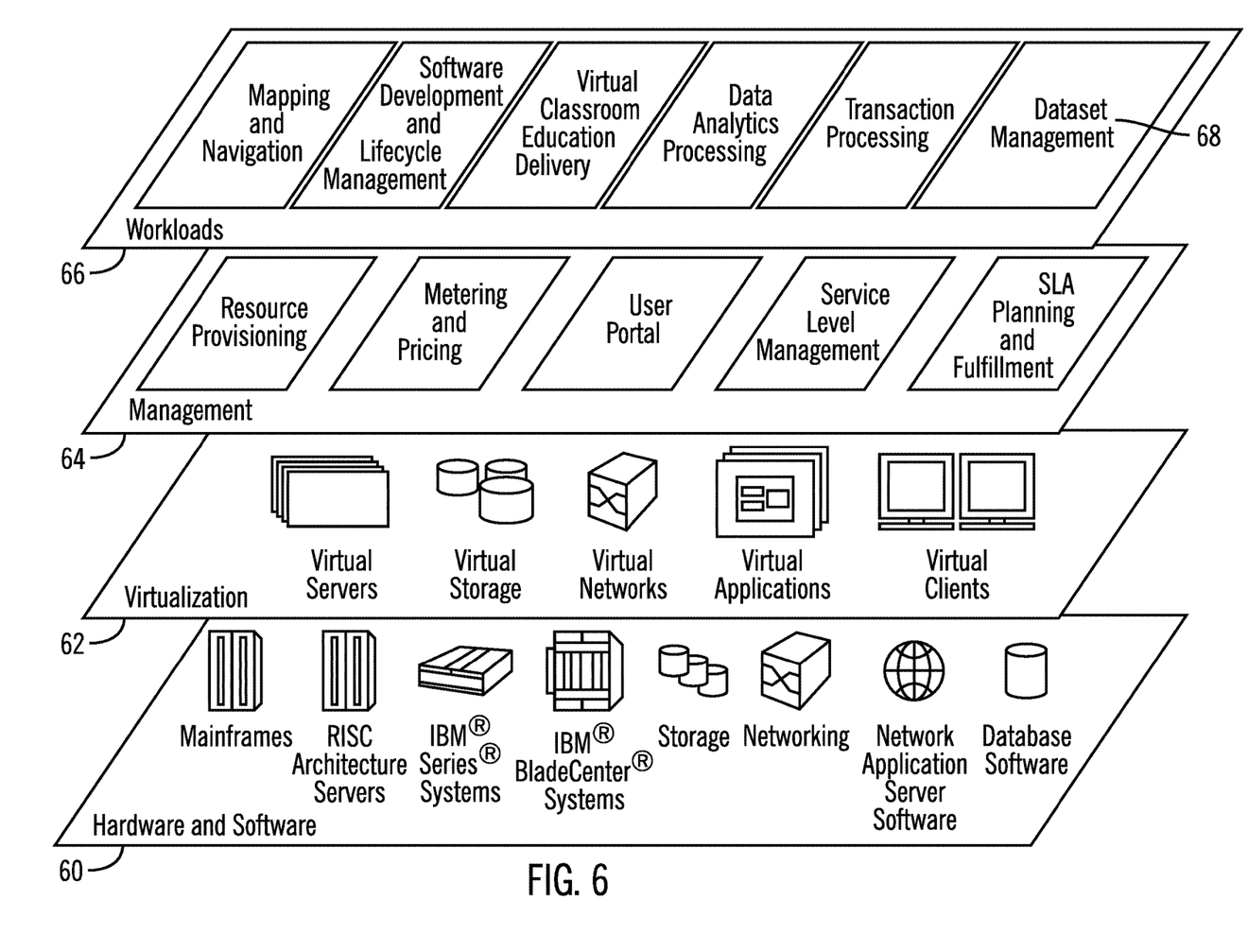
FIG. 6 illustrates a block diagram of further details of the cloud computing environment of FIG. 5, in accordance with certain embodiments.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto.

Hardware and software layer 60 includes hardware and software components. Examples of hardware components include mainframes, in one example IBM zSeries* systems; RISC (Reduced Instruction Set Computer) architecture based servers, in one example IBM pSeries* systems; IBM xSeries* systems; IBM BladeCenter* systems; storage devices; networks and networking components. Examples of software components include network application server software, in one example IBM Web Sphere* application server software; and database software, in one example IBM DB2* database software.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses.

Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and dataset management 68 as shown in FIGS. 1-6.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product. The computer program product may include a computer readable storage medium (or media) having computer readable program instructions thereon for causing a processor to carry out aspects of the present embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

Aspects of the present embodiments are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instruction.

Figure 7:
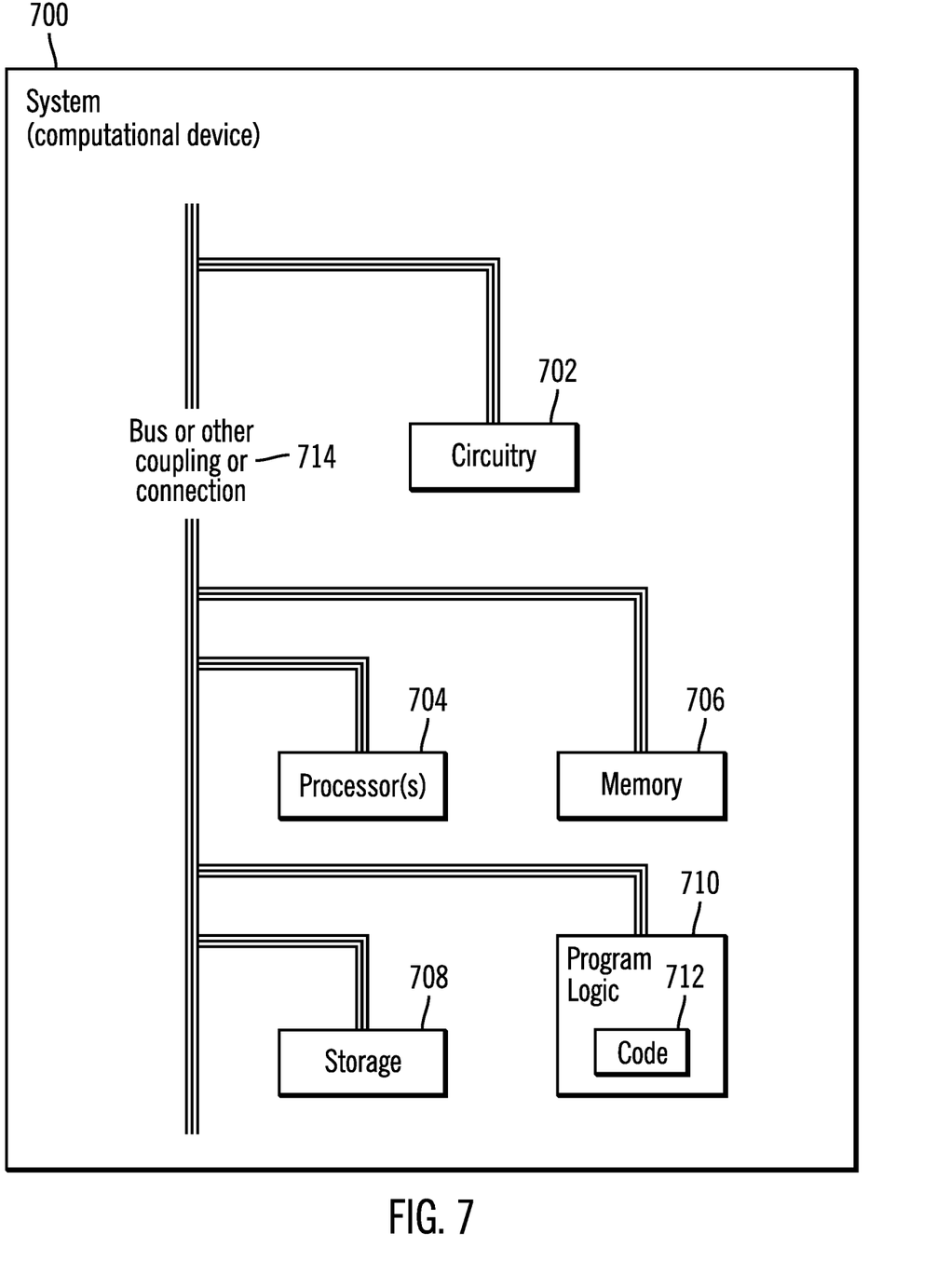
FIG. 7 illustrates a block diagram of a computational system as described in FIGS. 1-6, in accordance with certain embodiments.

FIG. 7 illustrates a block diagram of a system 700 that shows certain elements that may be included in the computational device 102 in accordance with certain embodiments. The system 700 may include a circuitry 702 that may in certain embodiments include at least a processor 704. The system 700 may also include a memory 706 (e.g., a volatile memory device), and storage 708. The storage 708 may include a non-volatile memory device (e.g., EEPROM, ROM, PROM, flash, firmware, programmable logic, etc.), magnetic disk drive, optical disk drive, tape drive, etc. The storage 708 may comprise an internal storage device, an attached storage device and/or a network accessible storage device. The system 700 may include a program logic 710 including code 712 that may be loaded into the memory 706 and executed by the processor 704 or circuitry 702. In certain embodiments, the program logic 710 including code 712 may be stored in the storage 708. In certain other embodiments, the program logic 710 may be implemented in the circuitry 702. One or more of the components in the system 700 may communicate via a bus or via other coupling or connection 714. Therefore, while FIG. 7 shows the program logic 710 separately from the other elements, the program logic 710 may be implemented in the memory 706 and/or the circuitry 702.

Certain embodiments may be directed to a method for deploying computing instruction by a person or automated processing integrating computer-readable code into a computing system, wherein the code in combination with the computing system is enabled to perform the operations of the described embodiments.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods, and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

At least certain operations that may have been illustrated in the figures show certain events occurring in a certain order. In alternative embodiments, certain operations may be performed in a different order, modified, or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter the invention, the invention resides in the claims hereinafter appended.

* IBM, zSeries, pSeries, xSeries, BladeCenter, Web Sphere, IBM Watson, and DB2 are trademarks of International Business Machines Corporation registered in many jurisdictions worldwide. PyTorch is a trademark of Facebook, Inc. Tensorflow is a trademark of Google, Inc.

What is claimed is:

1. A method, comprising:
   storing, in a capacity storage tier, a dataset formatted in a first format, wherein the dataset formatted in the first format includes at least a plurality of data elements that comprise data;
   selecting, via a computational device, a machine learning framework, wherein the machine learning framework operates on datasets formatted in a second format that is different from the first format; and
   converting, via the computational device, the dataset from the first format to the second format and generating symbolic links or hard links from the converted dataset formatted in the second format to the plurality of data elements of the dataset formatted in the first format to avoid creating additional copies of the plurality of data elements, wherein the dataset formatted in the first format is generated from search results, wherein a directory structure for the machine learning framework is automatically created in a performance storage tier and the symbolic links or the hard links to the plurality of data elements of the dataset formatted in the first format and generated from the search results are created in one or more directories, wherein files or objects of the dataset are copied from the capacity storage tier into the performance storage tier, and wherein as the files or the objects of the dataset are copied into the performance storage tier, the dataset is registered with a workflow support application based on the selected machine language framework and a workflow to train a machine learning model is automatically invoked while the dataset is being prefetched from the capacity storage tier to the performance storage tier.

2. The method of claim 1, the method further comprising:
   in response to identifying the files or the objects associated with a selected dataset based on system or custom metadata, copying the selected dataset from the capacity storage tier to the performance storage tier and while performing the copying to the performance storage tier ensuring that the files or the objects are copies in the second format required for the machine learning framework.

3. The method of claim 2, wherein the capacity storage tier has a greater storage capacity but a lower speed of performance for input/output (I/O) operations in comparison to the performance storage tier.

4. The method of claim 3, wherein on completion of a workflow in the machine learning framework, new results are written to the capacity storage tier.

5. The method of claim 2, wherein the converting is performed in response to receiving a notification from a storage device that new data exists.

6. The method of claim 2, the copying of the selected dataset from the capacity storage tier to the performance storage tier is performed, in response to receiving a notification from a storage device that new data exists.

7. The method of claim 2, wherein the workflow for training in the machine learning framework is invoked while pre-fetching the selected dataset from the capacity storage tier to the performance storage tier.

8. A system, comprising:
   a memory; and
   a processor coupled to the memory, wherein the processor performs operations, the operations performed by the processor comprising:
      storing, in a capacity storage tier, a dataset formatted in a first format, wherein the dataset formatted in the first format includes at least a plurality of data elements that comprise data;
      selecting, via a computational device, a machine learning framework, wherein the machine learning framework operates on datasets formatted in a second format that is different from the first format; and
      converting, via the computational device, the dataset from the first format to the second format and generating symbolic links or hard links from the converted dataset formatted in the second format to the plurality of data elements of the dataset formatted in the first format to avoid creating additional copies of the plurality of data elements, wherein the dataset formatted in the first format is generated from search results, wherein a directory structure for the machine learning framework is automatically created in a performance storage tier and the symbolic links or the hard links to the plurality of data elements of the dataset formatted in the first format and generated from the search results are created in one or more directories, wherein files or objects of the dataset are copied from the capacity storage tier into the performance storage tier, and wherein as the files or the objects of the dataset are copied into the performance storage tier, the dataset is registered with a workflow support application based on the selected machine language framework and a workflow to train a machine learning model is automatically invoked while the dataset is being prefetched from the capacity storage tier to the performance storage tier.

9. The system of claim 8, the operations further comprising:
in response to identifying the files or the objects associated with a selected dataset based on system or custom metadata, copying the selected dataset from the capacity storage tier to the performance storage tier and while performing the copying to the performance storage tier ensuring that the files or the objects are copies in the second format required for the machine learning framework.

10. The system of claim 9, wherein the capacity storage tier has a greater storage capacity but a lower speed of performance for input/output (I/O) operations in comparison to the performance storage tier.

11. The system of claim 10, wherein on completion of a workflow in the machine learning framework, new results are written to the capacity storage tier.

12. The system of claim 9, wherein the converting is performed in response to receiving a notification from a storage device that new data exists.

13. The system of claim 9, the copying of the selected dataset from the capacity storage tier to the performance storage tier is performed, in response to receiving a notification from a storage device that new data exists.

14. The system of claim 9, wherein the workflow for training in the machine learning framework is invoked while pre-fetching the selected dataset from the capacity storage tier to the performance storage tier.

15. A computer program product comprising a computer readable storage medium having computer readable program code embodied therewith, the computer readable program code configured to perform operations, the operations comprising:
storing, in a capacity storage tier, a dataset formatted in a first format, wherein the dataset formatted in the first format includes at least a plurality of data elements that comprise data;
selecting, via a computational device, a machine learning framework, wherein the machine learning framework operates on datasets formatted in a second format that is different from the first format; and
converting, via the computational device, the dataset from the first format to the second format and generating symbolic links or hard links from the converted dataset formatted in the second format to the plurality of data elements of the dataset formatted in the first format to avoid creating additional copies of the plurality of data elements, wherein the dataset formatted in the first format is generated from search results, wherein a directory structure for the machine learning framework is automatically created in a performance storage tier and the symbolic links or the hard links to the plurality of data elements of the dataset formatted in the first format and generated from the search results are created in one or more directories, wherein files or objects of the dataset are copied from the capacity storage tier into the performance storage tier, and wherein as the files or the objects of the dataset are copied into the performance storage tier, the dataset is registered with a workflow support application based on the selected machine language framework and a workflow to train a machine learning model is automatically invoked while the dataset is being prefetched from the capacity storage tier to the performance storage tier.

16. The computer program product of claim 15, the operations further comprising:
in response to identifying the files or the objects associated with a selected dataset based on system or custom metadata, copying the selected dataset from the capacity storage tier to the performance storage tier and while performing the copying to the performance storage tier ensuring that the files or the objects are copies in the second format required for the machine learning framework.

17. The computer program product of claim 16, wherein the capacity storage tier has a greater storage capacity but a lower speed of performance for input/output (I/O) operations in comparison to the performance storage tier.

18. The computer program product of claim 17, wherein on completion of a workflow in the machine learning framework, new results are written to the capacity storage tier.

19. The computer program product of claim 16, wherein the converting is performed in response to receiving a notification from a storage device that new data exists.

20. The computer program product of claim 16, the copying of the selected dataset from the capacity storage tier to the performance storage tier is performed, in response to receiving a notification from a storage device that new data exists.

* * * * *